(12) United States Patent
Lee et al.

(10) Patent No.: US 9,224,246 B2
(45) Date of Patent: Dec. 29, 2015

(54) METHOD AND APPARATUS FOR PROCESSING MEDIA FILE FOR AUGMENTED REALITY SERVICE

(71) Applicants: Samsung Electronics Co., Ltd., Gyeonggi-do (KR); Kyonggi University Industry & Academia Cooperation Foundation, Gyeonggi-do (KR)

(72) Inventors: Byoung-Dai Lee, Gyeonggi-do (KR); Sung-Ryeul Rhyu, Gyeonggi-do (KR); Yiling Xu, Gyeonggi-do (KR); Jae-Yeon Song, Seoul (KR)

(73) Assignees: Samsung Electronics Co., Ltd. (KR); Kyonggi University Industry & Academia Cooperation Foundation (KR)

( * ) Notice: Subject to any disclaimer, the term of this patent is extended or adjusted under 35 U.S.C. 154(b) by 312 days.

(21) Appl. No.: 13/838,258

(22) Filed: Mar. 15, 2013

(65) Prior Publication Data

US 2013/0249900 A1   Sep. 26, 2013

(30) Foreign Application Priority Data

Mar. 23, 2012  (KR) .......................... 10-2012-0030099

(51) Int. Cl.
*G06T 19/00* (2011.01)

(52) U.S. Cl.
CPC ..................................... *G06T 19/006* (2013.01)

(58) Field of Classification Search
None
See application file for complete search history.

(56) References Cited

U.S. PATENT DOCUMENTS

| 2005/0289590 | A1* | 12/2005 | Cheok et al. ..................... 725/37 |
| 2009/0307258 | A1* | 12/2009 | Priyadarshi et al. .......... 707/102 |
| 2010/0045869 | A1  | 2/2010  | Baseley et al. |
| 2010/0216108 | A1* | 8/2010  | Cooperman et al. .......... 434/317 |
| 2012/0249528 | A1  | 10/2012 | Park et al. |

FOREIGN PATENT DOCUMENTS

| KR | 101056418   | 8/2011 |
| KR | 1020110104686 | 9/2011 |
| KR | 1020120004320 | 1/2012 |

(Continued)

OTHER PUBLICATIONS

B.S. Choi et al., "Metadata for AR Broadcasting System", Motion Picture Expert Group, ISO/IEC JTC 1/SC 29/WG11 m23837, Feb. 3, 2012, 6 pages.

(Continued)

*Primary Examiner* — Joni Richer
*Assistant Examiner* — Yi Wang
(74) *Attorney, Agent, or Firm* — The Farrell Law Firm, P.C.

(57) ABSTRACT

A method and an apparatus for processing a media file for an augmented reality service are provided. The method includes analyzing at least one media file including a marker track and a virtual object track to be used for providing the augmented reality service; generating image data needed for reproducing an image by extracting video data and/or audio data included in the media file; generating virtual object data for displaying a virtual object by extracting virtual object information included in the media file; and synthesizing the image data and the virtual object data based on the marker track to structure a final image and reproducing the final image on a screen.

26 Claims, 11 Drawing Sheets

(56) References Cited

FOREIGN PATENT DOCUMENTS

KR          1020120006312       1/2012
WO          WO 2009/149440      12/2009

OTHER PUBLICATIONS

Junghak Kim et al., "System Architecture for AR Broadcasting", Motion Picture Expert Group, ISO/IEC JTC 1/SC 29/WG 11 m23635, Feb. 3, 2012, 4 pages.

International Standard ISO/IEC 14496-12, Information Technology—Coding of Audio-Visual Objects—Part 12 ISO Base Media File Format, Second Edition Apr. 1, 2005, 90 pages.

Marius Preda et al., "Ad Hoc Group on ARAF", Motion Picture Expert Group, ISO/IEC JTC1/SC29/WG11, MPEG2012/ m 22874, Feb. 6, 2012, 3 pages.

Ig-Jae Kim at al., "MART-MAF: Media File Format for AR Tour Guide Service", 2009 11th IEEE International Symposium on Multimedia, Dec. 14, 2009, 4 pages.

Byoung-Dai Lee, "Design of an Augmented Reality-Enabled Multimedia File Format with Embedded Object Tracking Metadata". International Journal of Multimedia and Ubiquitous Engineering, vol. 8, No. 4, Jul. 30, 2013, 10 pages.

European Search Report dated Sep. 30, 2015 issued in counterpart application No. 13763778.1-1502, 12 pages.

\* cited by examiner hdlr (Handler Reference Box) ~708

```
aligned(8) class HandlerBox extends FullBox('hdlr', version = 0,0) {
    unsigned int (32) pre_defined = 0;
    unsigned int (32) handler_type;
    const unsigned int (32)[3] reserved = 0;
    string name
}
```

■ handler_type

| Prior | After Extension |
|---|---|
| - 'vide' - Video track<br>- 'soun' - Sound track<br>- 'hint' - Hint track<br>- 'meta' - Timed Metadata track<br>- 'auxv' - Auxiliary Video track | - 'vide' - Video track<br>- 'soun' - Sound track<br>- 'hint' - Hint track<br>- 'meta' - Timed Metadata track<br>- 'auxv' - Auxiliary Video track<br>- 'loct' - Location track<br>- 'objt' - 3D Object track |

FIG.7B otbl (1302)

othd
next_object_ID = 3;
group_entry_count = 2;

mtbl
mapping_entry_count = 2;
(1, 1)
(2, 2)

odes — 1304a
object_ID = 1;
type = "VRML"
object_desc = 😊
transformation_matrix = { ... }
rotation_matrix = { ... }
scale_matrix = { ... } odes — 1304b
object_ID = 1;
type = "3DXML"
object_desc = 😊
transformation_matrix = { ... }
rotation_matrix = { ... }
scale_matrix = { ... } odes
object_ID = 2;
type = "VRML"
object_desc = ♡
transformation_matrix = { ... }
rotation_matrix = { ... }
scale_matrix = { ... }

FIG.13

METHOD AND APPARATUS FOR PROCESSING MEDIA FILE FOR AUGMENTED REALITY SERVICE

PRIORITY

This application claims priority under 35 U.S.C. §119(a) to Korean Application Ser. No. 10-2012-0030099, which was filed in the Korean Intellectual Property Office on Mar. 23, 2012, the entire content of which is incorporated herein by reference.

BACKGROUND OF THE INVENTION

1. Field of the Invention

The present invention relates generally to the processing of a media file, and more particularly, to a method and an apparatus for providing and processing a media file for an Augmented Reality (AR) service.

2. Description of the Related Art

Augmented Reality refers to a technology of showing a virtual object (i.e., an AR object) that overlaps with real world images a user can see. The augmented reality is a concept of synthesizing real time image/voice information and the virtual object or related information to provide an augmented information service, and is called a Mixed Reality (MR) in terms of expanding human senses and recognition. Particularly, since a mobile terminal and a smart phone having various sensors such as a camera or a Global Positioning System (GPS) built therein are widely distributed and various consolidated services using high speed mobile Internet have been introduced, the use of an augmented reality service using a mobile device is rapidly increasing.

An International Organization for Standardization (IOS) media file format (FF) defines a general structure for a time based multimedia file such as a video or an audio file and is used based on a format of other files such as an MEPG (Moving Picture Experts Group)-4 (MP4) or 3GPP (3rd Generation Partnership Project) file format.

FIG. 1 illustrates a logical configuration of an ISO based media file in the prior art, and as shown in FIG. 1, a media file 100 is configured in a file header area 102, a metadata area 104, and a media data area 106.

The file header area 102 includes basic information of content included in the media file. For example, information such as a content identifier, a content manufacturer, and a manufacture time may be included in the file header. When the media file is divided into a plurality of tracks or streams, map configuration information of each track may be further included.

The metadata area 104 includes individual information of a plurality of media objects of the content included in the media file. Various pieces of profile information for decoding the media object and information about a location of the media object is included. Here, the media object is the minimum unit of a content. In a case of a video, an image frame displayed on a screen in every unit period may be the media object, and in a case of a voice, an audio frame reproduced in every unit period may be the media object. A plurality of media objects may exist in each track and information needed to reproduce the media objects is included in the metadata area 104.

The media data area 106 is an area in which the media object is actually stored.

A physical structure of the ISO based media file comprises boxes. An individual box may be configured in related data and lower ranking boxes, or exists as a container box comprised of only the lower ranking boxes. For example, a track schematically shown in FIG. 1 is physically stored in a track box, and a track box is a container box comprised of various lower ranking boxes which store track header information, media information, media decoding information, etc.

A conventional ISO based media file does not define any meta information needed for providing the augmented reality service, and also, does not provide a method of synthesizing a multimedia content included in different layers, i.e., an instruction method for reproducing an image and the virtual object in overlapping relation. Therefore, the conventional ISO based media file is limited in utilizing the augmented reality service.

In the conventional technology, an apparatus for reproducing the media file analyzes an image currently reproduced in real time, extracts an area for displaying the virtual object, displays the virtual object on a corresponding area and then synthesizes the virtual object with an image being reproduced to provide a final image to a user. Extracting an area in which the virtual object is to be displayed in the image is a major technology of the augmented reality and is divided into a marker based technology and a non-marker based technology. In marker based augmented reality, an image including a particular image of a marker such as a black and white pattern or a barcode is recognized by the apparatus, a relative coordinate of an area in which the virtual object is to be displayed is determined, and the virtual object is displayed based thereon, whereas, in non-marker based augmented reality, an object within the image is directly identified and related information is obtained.

The former case is advantageous in that a location in which the virtual object is to be located can be relatively accurately provided compared to non-marker based technology; however, it is impossible to provide a natural image because the marker always needs to be included within the image. In the latter case, the marker does not need to be inserted within the image, and thus, the image is more natural compared to a marker based image. Also, the augmented reality service may be provided with respect to a media file that is written without considering a conventional augmented reality. However, since an object within the image is accurately recognized in real time to extract a feature point at which the virtual object is displayed, accuracy is relatively lower as compared to the marker based technology. In addition, in most of the non-marker based feature point extraction methods currently suggested, a significant computation amount needs to be processed in a receiving terminal, which eventually means that the quality of the augmented reality service may vary depending on an applied feature point extraction algorithm and a computation capacity of the receiving apparatus (or reproducing apparatus).

On the other hand, in a conventional augmented reality service, a virtual object displayed to a user and additional information are determined by an application program which provides a corresponding service. For example, in a case of an augmented reality service which provides a logo of a related company intermittently for purpose of promoting a product, a logo displayed to the user is determined entirely by the application program. Therefore, in the conventional augmented reality technology, an advertisement image is displayed regardless of the content of an image actually reproduced, and thus the effectiveness of the advertisement may be reduced.

SUMMARY OF THE INVENTION

The present invention has been made to address at least the problems and disadvantages described above, and to provide at least the advantages described below. Accordingly, aspects of the present invention provide a PDSCH transmission method, which can increase the peak rate and system throughput of the terminal user.

Accordingly, an aspect of the present invention is to provide a method and apparatus of providing an augmented reality service using a media file.

Another aspect of the present invention is to provide a method and an apparatus for providing a media file that provides an augmented reality service.

Another aspect of the present invention is to provide a method and an apparatus for processing a media file that provides an augmented reality service.

Another aspect of the present invention is to provide a method and an apparatus for reproducing a media file that provides an augmented reality service.

Another aspect of the present invention is to provide a method and an apparatus for displaying meta information needed to provide an augmented reality service within a media file, i.e., embedding a virtual object and additional information for displaying the virtual object on a screen, and displaying a correlation relationship between a plurality of media for reproducing an image and the virtual object in overlapping relation.

In accordance with an aspect of the present invention, a method of processing a media file for an augmented reality service is provided. The method includes analyzing at least one media file including a marker track and a virtual object track to be used for providing the augmented reality service; generating image data needed for reproducing an image by extracting video data and/or audio data included in the media file; generating virtual object data for displaying a virtual object by extracting virtual object information included in the media file; and synthesizing the image data and the virtual object data based on the marker track to structure a final image and reproducing the final image on a screen.

In accordance with another aspect of the present invention, an apparatus for processing a media file for an augmented reality service is provided. The apparatus includes: a media file analyzer for analyzing at least one media file including a marker track and a virtual object track to be used for providing the augmented reality service; an image reproducing unit for generating image data needed for reproducing an image by extracting video data and/or audio data included in the media file; a virtual object reproducing unit for generating virtual object data for displaying a virtual object by extracting virtual object information included in the media file; and an image synthesis unit for synthesizing the image data and the virtual object data based on the marker track to structure a final image and reproducing the final image on a screen.

BRIEF DESCRIPTION OF THE DRAWINGS

The above and other aspects, features, and advantages of the present invention will be more apparent from the following detailed description taken in conjunction with the accompanying drawings, in which:

FIGS. 7A and 7B are schematic views illustrating main boxes within a marker track and a correlation relation between such boxes according to an embodiment of the present invention;

FIGS. 12 and 13 illustrate contents of a main box of a marker track and a virtual object track according to an embodiment of the present invention.

DETAILED DESCRIPTION OF EMBODIMENTS OF THE PRESENT INVENTION

Hereinafter, various embodiments of the present invention will be described with reference to the accompanying drawings. In the following description, a detailed description of known functions and configurations incorporated herein will be omitted when it may make the subject matter of the present invention unclear. Further, the terms found in the following description are defined in consideration of functions thereof in the present invention, and it should be noted that such terms can vary depending on an operator's intent or custom. Therefore, the definitions thereof should be made based on the contents reflecting the entire description of the present specification.

Hereinafter, an extension part of an ISO media file format for storing meta information needed for providing an augmented reality service within an ISO based media file and an apparatus responsible for reproducing a media file written in the ISO media file format will be described.

Figure 1:
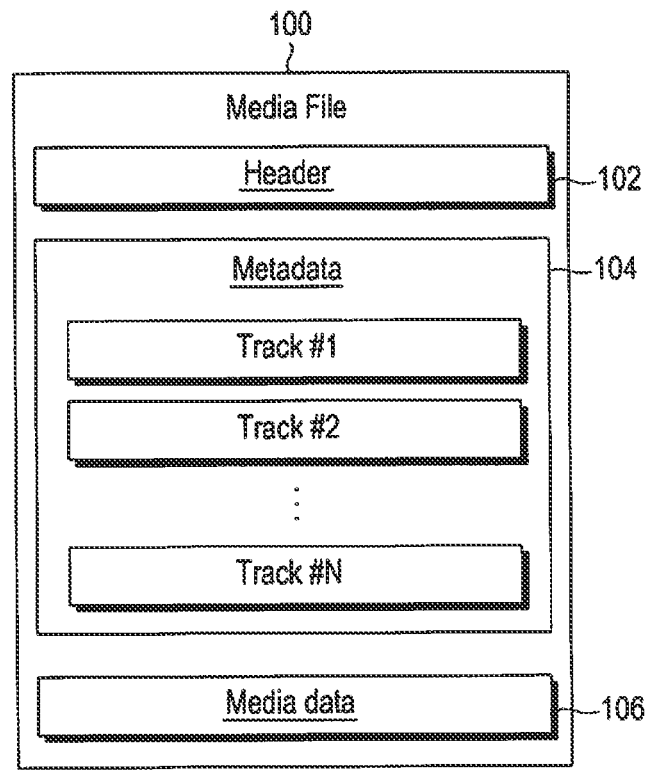
FIG. 1 illustrates a logical configuration of an ISO based media file in the prior art.
Figure 2:
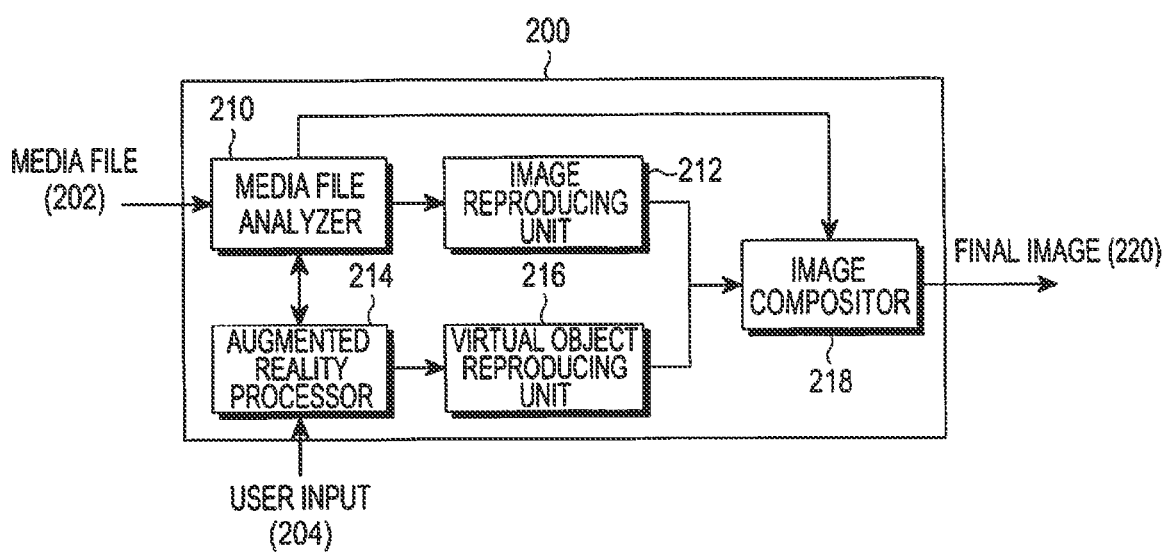
FIG. 2 is a schematic view illustrating a media file reproducing apparatus which supports an extension part of an ISO media file format according to an embodiment of the present invention.

FIG. 2 is a schematic diagram illustrating a media file reproducing apparatus which supports an extension part of an ISO media file format according to an embodiment of the present invention. A media file reproducing apparatus 200 is provided within a receiving apparatus configured to process a media file and provide the augmented reality service.

Referring to FIG. 2, a media file analyzer 210 analyzes a media file 202 provided as an input to extract various bits of information, including meta information needed for providing the augmented reality service which is needed for reproducing a media file. An augmented reality processor 214 activates or deactivates the augmented reality service based on a user input 204. An image reproducing unit 212 extracts video/audio data included in the media file and processes the video/audio data to generate image data needed for reproducing an image. Similarly, a virtual object reproducing unit 216 extracts virtual object information included in a media file and processes the virtual object information to generate virtual object data for displaying a virtual object (i.e., an AR object) on a screen (not shown). An image compositor 218 receives image data to be displayed on the screen and virtual object data respectively from the image reproducing unit 212 and the virtual object reproducing unit 216 and compounds the image data and the virtual object data to configure and display a final image 220 on the screen. Particularly, the image compositor 218, in association with the media file analyzer 210, determines a correlation relationship for displaying the image and the virtual object, i.e., whether to reproduce the image and the virtual object in overlapping relation, whether to reproduce the image only, or whether to reproduce the virtual object only.

An embodiment of the present invention includes a receiving apparatus capable of generating and/or storing a media file of an ISO media file format and processing and reproducing a media file or a media file providing apparatus (e.g., a media file server) for providing the media file to an intermediate apparatus.

Figure 3:
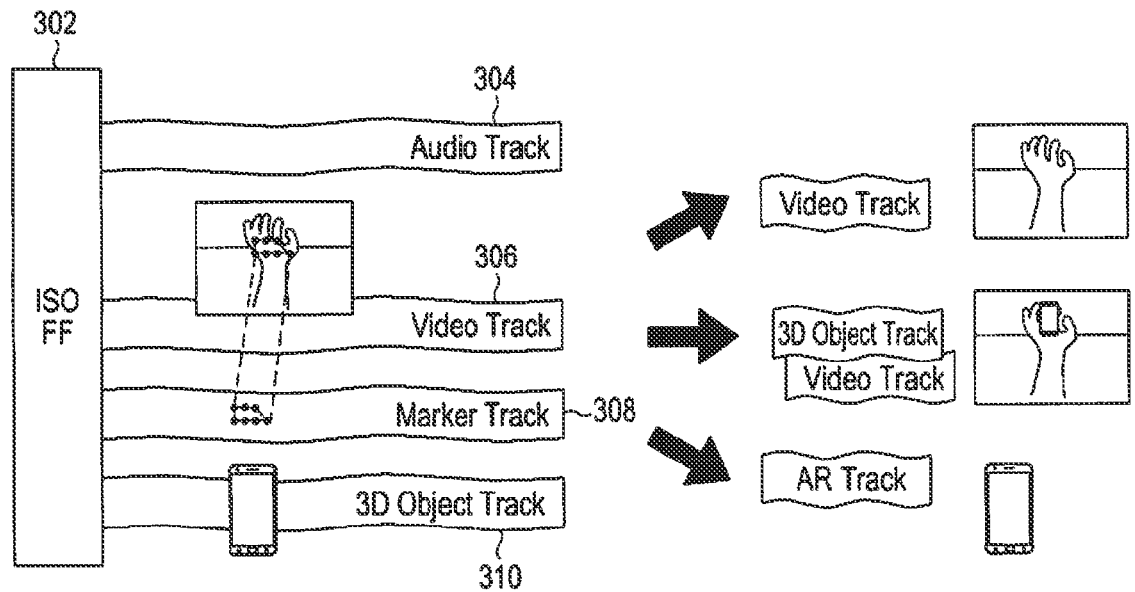
FIG. 3 is a schematic view illustrating an extension part of an ISO media file format (FF) according to an embodiment of the present invention.

FIG. 3 is a schematic view illustrating an extension part of an ISO media file format (FF) according to an embodiment of the present invention, and as shown in FIG. 3, an ISO media file format 302 includes a video track 306 and an audio track 304 for a multimedia content which exists on an existing ISO media file as well as a virtual object track 310 and a marker track 308 for providing the augmented reality service. For example, the virtual object track 310 may be a virtual object which can be augmented on a real world object (i.e., an image) provided through the video track 306 and may include address information which can access a three dimensional (3D) object or the virtual object. The tracks 304, 306, 308 and 310 may be configured in one or more file streams. For example, the marker track 308 and the virtual object track 310 may be configured in a file stream (or file streams) separate from the video/audio tracks 304 and 306.

The marker track 308 includes a relative coordinate of an area in which the virtual object is displayed on the screen and additional information needed to express the virtual object. Therefore, in the media file reproducing apparatus, without using a process for obtaining a marker coordinate, i.e., a process of recognizing a marker image, calculating a relative coordinate of a marker relative to a camera coordinate system, etc. in a conventional marker based augmented reality service, an area in which the virtual object is to be displayed may be identified by using only information included in the marker track.

The virtual object track 310 is a track that stores the virtual object to be displayed on the screen and serves as a container that stores an expression equation of the virtual object in order to accept various augmented reality technologies. Particularly, a plurality of virtual object tracks may exist within the media file. An individual virtual object track stores the virtual object for providing different types of additional information, providing address information for accessing the virtual object, or providing a separate virtual object track per augmented reality service provider, thereby being able to provide an independent augmented reality service to an application program.

Hereinafter, embodiments which represent a correlation relationship between media for instructing screen synthesis for the augmented reality as well as defining meta information for the augmented reality will be described. For example, in the embodiment of FIG. 3, the virtual object used in the augmented reality is reproduced in overlapping relation with an image provided by the video track or a screen synthesis method of reproducing the image or the virtual object only.

Figure 4:
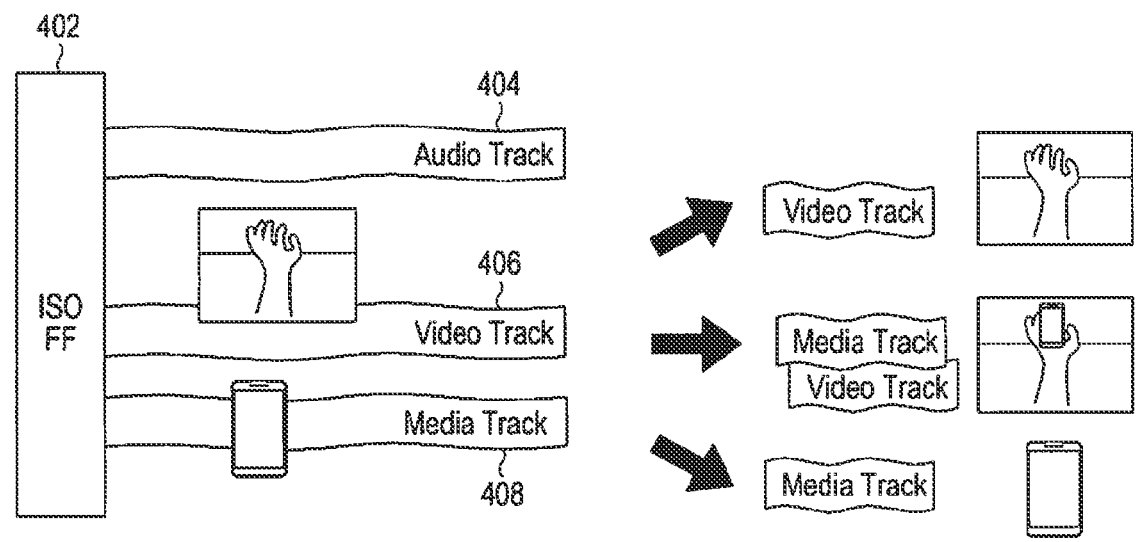
FIG. 4 is a schematic view illustrating an ISO media file format (FF) according to another embodiment of the present invention.

FIG. 4 is a schematic view illustrating an ISO media file format (FF) according to another embodiment of the present invention. As shown in FIG. 4, an ISO media file format 402, together with an audio track 404 and a video track 406, instructs synthesis of another media track 408, including an additional video track, and an image.

1) Marker track

A primary role of the marker track is to provide a relative coordinate of an area in which the virtual object is displayed on the screen and additional information, for example, light source information, needed to express the virtual object. In other words, an apparatus assumes that a virtual marker exists within the image and extracts all information provided by the marker from the media file to obtain the same effect as if the marker is included within an actual image.

Figure 5:
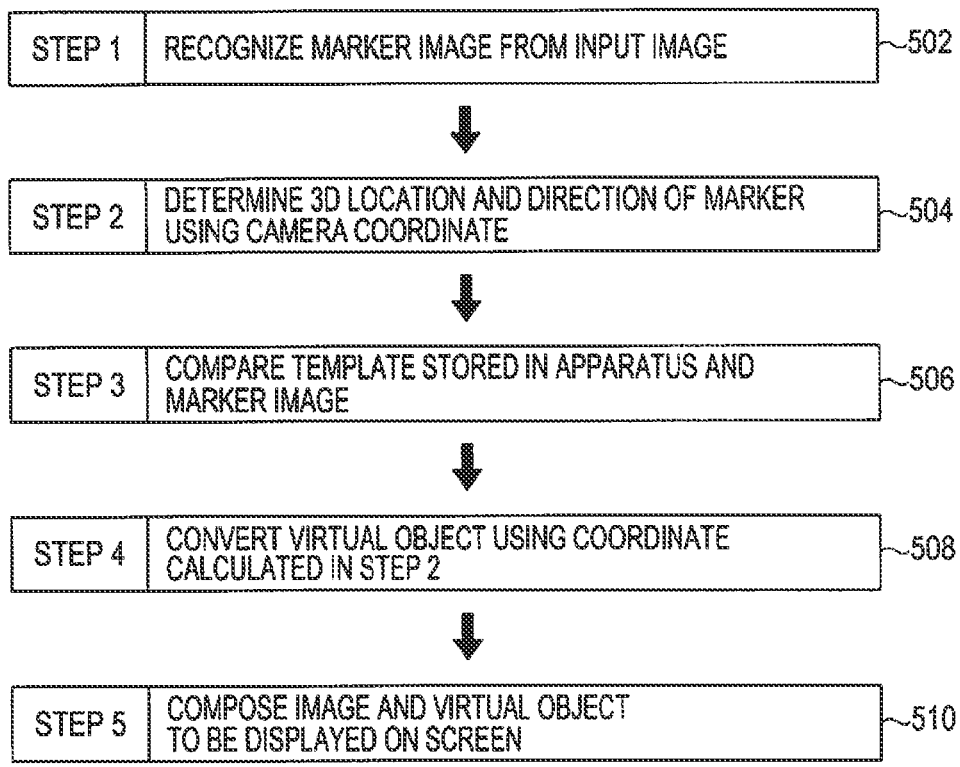
FIG. 5 is a schematic flowchart illustrating a conventional step of processing a marker based augmented reality.

FIG. 5 is a schematic flowchart illustrating a conventional step of processing a marker based augmented reality. Referring to FIG. 5, the apparatus recognizes a marker image from an input image in a first step S502, calculates a three dimensional location (i.e., a coordinate) of the marker image by using a camera coordinate in a second step 504, compares a template stored in the apparatus with the marker image in a third step 506, converts the marker image into a virtual object by using the calculated coordinate in a fourth step 508, and composes the image and the virtual object to be displayed on the screen in a fifth step 510.

Coordinate and direction information, which is one important piece of information stored in the marker track, corresponds to a result of executing the first through third steps 502, 504, 506 of FIG. 5. The apparatus, to which an embodiment of the present invention for providing the marker track applies, identifies an area in which the virtual object is to be displayed by using only information included in the marker track, without using steps 502, 504, 506 for obtaining the marker coordinate, i.e., the process of recognizing the marker image, calculating the relative coordinate of the marker relative to the camera coordinate system, etc. in the conventional marker based augmented reality service.

When the image is reproduced, the virtual object needs to move continuously together with the image relative to the time axis. To this end, the apparatus refers to a marker interval on the time axis, which is defined based on a characteristic (e.g., a movement speed, a light source, etc.) generated when the virtual object moves, locates the virtual marker at a start point and an end point of each interval, and then stores the virtual marker in a media file of corresponding virtual marker information.

Expression of the virtual object in an intermediate point of the marker interval is calculated by using marker information of the start point and the end point. For example, when it is assumed that luminance (i.e., brightness) of a light which illuminates the virtual object is 1,000 lux at the start point of the interval and 2,000 lux at the end point, if the virtual object is continuously moved from the start point to the end point on the time axis, the virtual object is displayed on the screen while the luminance of the light is gradually increased from 1,000 lux to 2,000 lux. Therefore, the marker interval may be explained as an interval in which each characteristic (e.g., brightness) of the virtual object is gradually increased or decreased.

Figure 6:
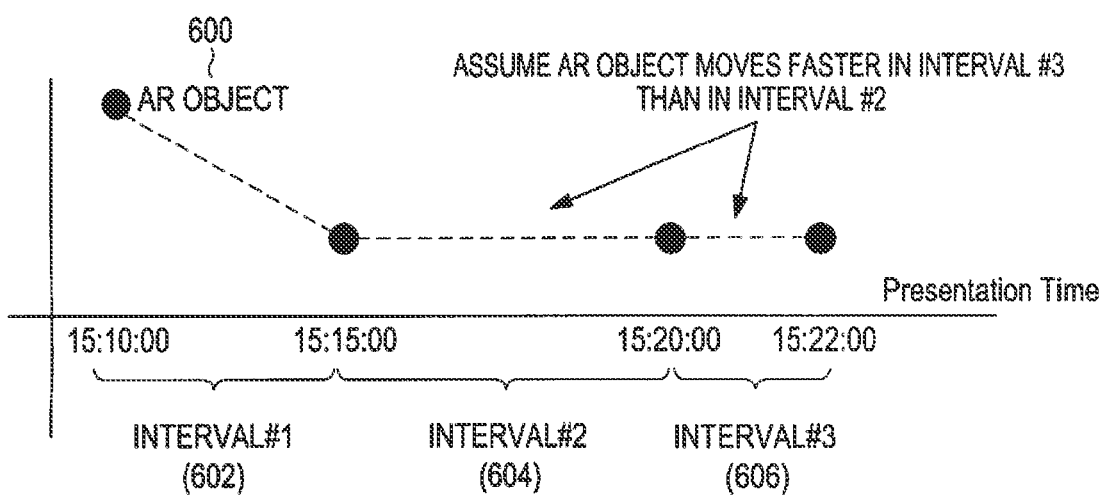
FIG. 6 is a schematic view illustrating an example of defining a marker interval based on a movement speed and a movement location on a straight line of a virtual object.

FIG. 6 is a schematic view illustrating an example of defining a marker interval based on a movement speed and a movement location on a straight line of a virtual object.

Referring to FIG. 6, the virtual object 600 is displayed on the screen from 15 minutes and 10 seconds to 15 minutes and 22 seconds after reproducing the image and moves from a left upper portion of the screen to a right lower portion of the screen. Specifically, the virtual object 600 moves from the left upper portion to the right lower portion of the screen in a marker interval #1 602 (15:10:00~15:15:00) at a predetermined speed and moves from the right lower portion to a left lower portion of the screen in a marker interval #2 604 (15:15:00~15:20:00). In a marker interval #3 606 (15:20:00~15:22:00), a circulation of the object is the same as the marker interval #2 (i.e., from the right lower portion to the left lower portion of the screen); however, a moving speed is different from that in the marker interval #2. Therefore, the marker interval #3 606 is defined as a separate interval from the marker interval #2 604.

Information about the virtual marker at the start point and the end point of each interval which is distinguished as above is stored in the media file. Therefore, as a range of each interval becomes narrow, synthesis of the virtual object and the image becomes more natural.

Figure 7A:
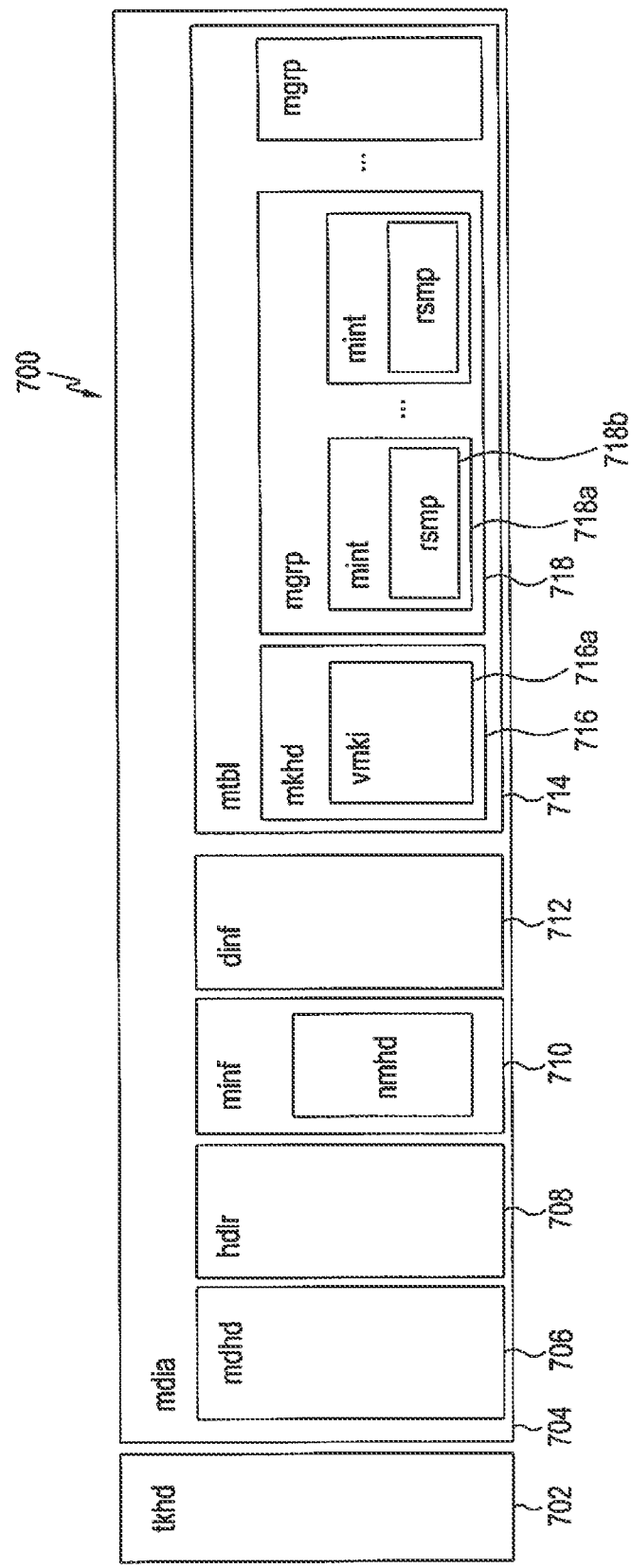

FIGS. 7A and 7B are schematic views illustrating main boxes within a marker track and a correlation relation between such boxes according to an exemplary embodiment of the present invention.

Referring to FIG. 7A, a marker track 700 has a form of extending a track box defined in an existing ISO media file format. Therefore, a track header (tkhd) box 702, and a media (mdia) box 704 are included. The mdia box 704 includes a media header (mdhd) box 706, a handler reference (hdlr) box 708, a media information (minf) box 710, and a data information (dinf) box 712.

The hdlr box 708 that stores a type of a current track is extended as shown in FIG. 7B in order to support the marker track and the virtual object track. After the extension, handler_type that stores the type of the current track within the hdlr box 708 may be set as one of a video track 'vide', a sound track 'soun', a hint track 'hint', a timed metadata track 'meta', an auxiliary video track 'auxv', a location track loct', or a 3D object track 'objt'.

When the handler_type of the hdlr box 708 is set as 'loct' or 'objt', a media information header box within the minf box 710 is set as a null media header (nmhd) box.

As already described above, in order to store the relative coordinate of the area in which the virtual object is displayed on the screen and the additional information needed to express the virtual object, the marker track 700 includes a maker table (mtbl) 714. The mtbl box 714 is a container box and is configured to contain a marker header (mkhd) box 716 and zero or more marker group (mgrp) boxes 718. One of the important roles of the mkhd box 716 is to store information about a reference virtual marker which is an object for comparison with the virtual marker used in the marker interval.

The marker image may have various forms such as a rectangular shape or a circular shape, and therefore, a virtual marker information (vmki) box 716a within the mkhd box 716 stores information of the virtual marker which is a reference of virtual markers used in each marker interval. The apparatus compares marker information used in an individual marker interval with the reference virtual marker information included in the vmki to extract extension or reduction information of the virtual marker, and such information eventually enables extension or reduction of the virtual object displayed on the virtual marker.

Figure 8:
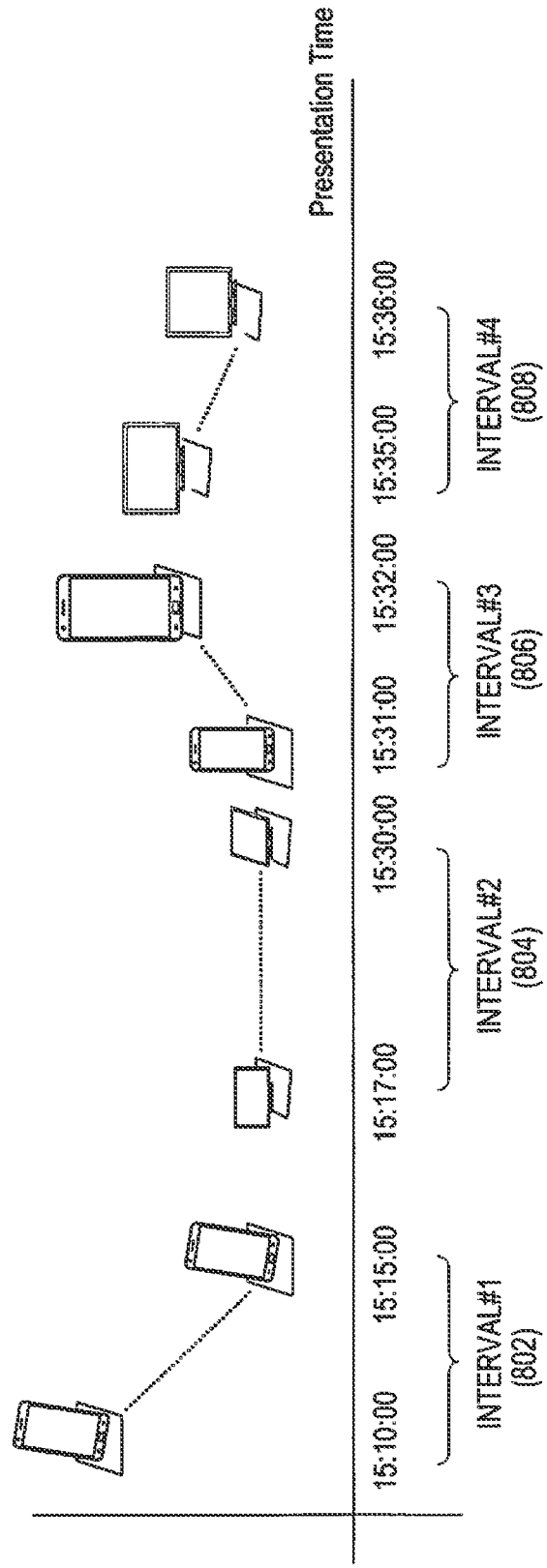
FIG. 8 is a schematic view illustrating another example of defining a marker interval based on a movement speed and a movement location on a straight line of a virtual object.

When the virtual object used in certain two marker intervals uses the same virtual object stored in the virtual object track, the two marker intervals are included in the same marker group. Referring to the example of FIG. 8, the marker interval #1 802 and the marker interval #3 806 are included in the same group, and similarly, the marker interval #2 804 and the marker interval #4 808 are also included in the same group. A shape of the virtual object when finally displayed on the screen may vary according to movement and extension/reduction of the virtual marker in three dimensions, and thus, the marker group is not determined according to the shape of the virtual object but the virtual object stored in the virtual object track. In other words, when two marker intervals are displayed on the screen by using the same virtual object stored in the virtual object track, the two marker intervals belong to the same group. This is similar to identifying an image included within a marker to locate a virtual object that needs to be displayed on a corresponding marker in the conventional marker based augmented reality.

Referring back to FIG. 7A, the marker interval is expressed by marker interval information (mint) box 718a within the mgrp box 718, and every marker interval included in the same group is included in the mgrp box 718. A related sample information (rsmp) box 718b within the mint box 718a stores sample information used in a corresponding marker interval.

An example format of the marker table (mtbl) box 714 is shown below.

```
aligned(8) class MarkerTable extends Box('mtbl') {
}
```

An example format of the marker header (mkhd) box 716 is shown below.

```
aligned(8) class MarkerHeader extends Box('mkhd') {
    unsigned int (32) related_track_ID;
    unsigned int (32) next_marker_ group_ID;
    unsigned int (32) marker_group_entry_count;
    VirtualMarkerInformation( );
}
```

Here, related_track_ID represents an ID of a video track to be displayed in overlapping relation with the virtual object, next_marker_group_ID is a value of the marker_group_ID to be used subsequently, of which an initial value is set to 1, and the mgrp box 718 which uses the same marker_group_ID does not exist. Marker_group_entry_count represents a number of the mgrp box 718 included in the current track.

An example format of the virtual marker information (vmki) box 716a is shown below. The marker image may exist in various shapes such as a rectangular shape or a circular shape, and the vmki box 716a shown below is an example in which the virtual marker configured in the rectangular shape is displayed.

```
aligned(8) class VirtualMarkerInformation extends Box('vmki') {
    unsigned int (32) x1, y1, z1;
    unsigned int (32) x2, y2, z2;
    unsigned int (32) x3, y3, z3
    unsigned int (32) x4, y4, z4;
}
```

Here, x1, y1, z1 represent x, y, z coordinates of a vertex on a left upper end of the virtual marker, x2, y2, z2 represent x, y, z coordinates of a vertex on a right upper end of the virtual marker, x3, y3, z3 represent x, y, z coordinates of a vertex on a left lower end of the virtual marker, and x4, y4, z4 represent x, y, z coordinates of a vertex on a right lower end of the virtual marker.

An example of the marker group (mgrp) box 718 is shown below.

```
aligned(8) class MarkerGroup extends Box('mgrp') {
  unsigned int (32) marker_group_ID;
  unsigned int (32) next_marker_interval_ID;
  unsigned int (32) marker_interval_entry_count;
  for (i = 1; i < marker_interval_entry_count; ++i) {
    MarkerIntervalInformation( );
  }
}
```

Here, marker_group_ID represents an ID of a corresponding marker group, next_marker_interval_ID is a value of marker_interval_ID to be used subsequently, of which an initial value is set to 1, and the mint box using the same marker_interval_ID within a given mgrp box does not exist. Marker_interval_entry_count represents a number of the mint box 718a included in the mgrp box 718.

An example format of the marker interval information (mint) box 718a is shown below.

```
aligned(8) class MarkerIntervalInformation extends Box('mint') {
unsigned int (32) marker_interval_ID;
Region start_region;
Region end_region;
RelatedSampleInformation( );
}
```

Here, marker_interval_ID represents an ID of a corresponding marker interval, start_region represents detailed information of the start point of the marker interval, and end_region represents detailed information of the end point of the marker interval.

An example format of a region box is shown below. The region box stores the relative coordinate of the area in which the virtual object is displayed on the screen and additional information (for example, light source information) needed to express the virtual object. The below example is an example in which only location information of the virtual object is included.

```
aligned(8) class Region extends Box('rinf') {
VirtualMarkerInformation( );
}
```

An example format of the related sample information (rsmp) box 718b is shown below.

```
aligned(8) class RelatedSampleInformation extends Box('rsmp') {
unsigned int (32) first_sample;
unsigned int (32) sample_count;
}
```

Here, first_sample represents a first sample number of a corresponding marker interval, and sample_count represents a number of entire samples included in the corresponding marker interval.

2) Virtual Object Track

The virtual object track describes the virtual object used in the marker interval. Particularly, in order to support various augmented reality content and a service scenario, a plurality of virtual object tracks may exist within the media file, and each virtual object track provides marker_group_ID defined in the marker track and mapping information with the virtual object defined on the virtual object track. In addition, the virtual object track stores a virtual marker which becomes a reference point and information about how the virtual object is displayed on the screen in the corresponding virtual marker. In other words, movement, rotation, and extension/reduction information of the virtual object which is displayed on the reference virtual marker, which is specified in the vmki box 716a defined within the mkhd box 716 of the marker track, is stored.

Figure 9:
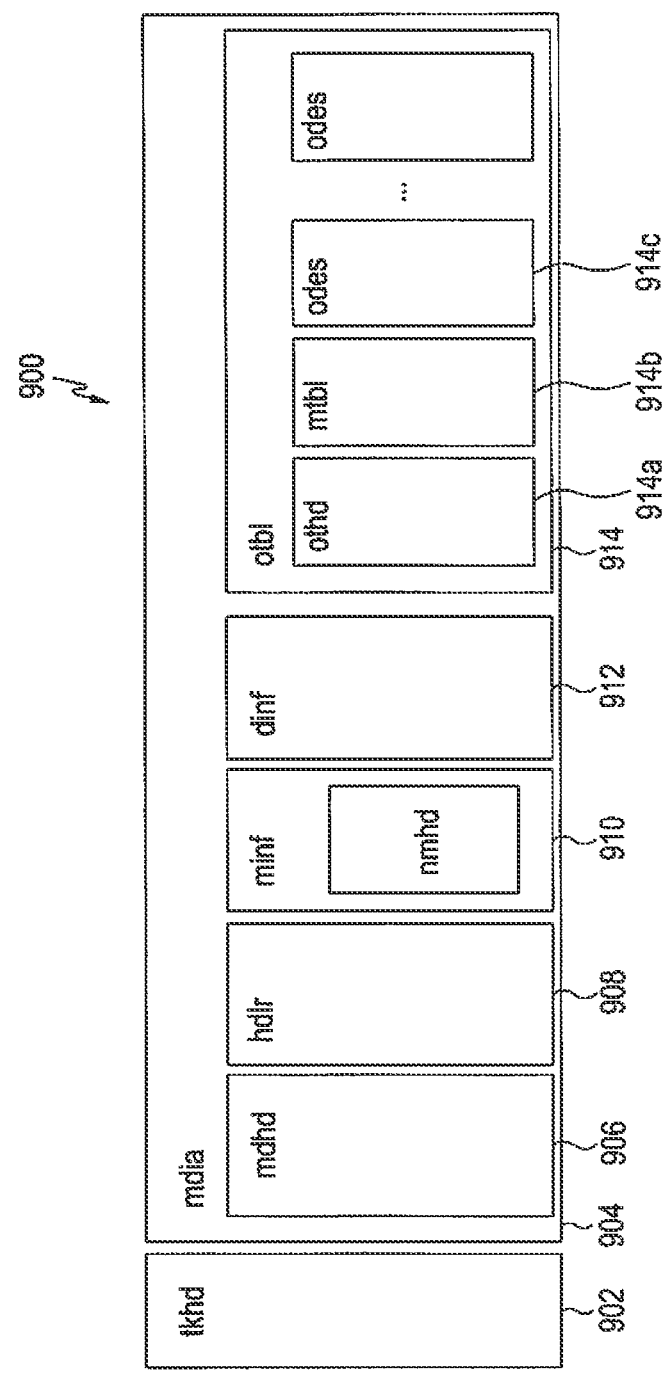
FIG. 9 is a schematic view illustrating main boxes within a virtual object track and a correlation relation between such boxes according to an embodiment of the present invention.

FIG. 9 is a schematic view illustrating main boxes within a virtual object track and a correlation relation between such boxes according to an embodiment of the present invention.

Referring to FIG. 9, a virtual object track 900 has a form of extending a track box defined in an existing ISO media file format, similar to the marker track 700. Therefore, a track header (tkhd) box 902 and a media (mdia) box 904 are included. The mdia box 904 includes a media header (mdhd) box 906, a handler reference (hdlr) box 908, a media information (minf) box 910, and a data information (dinf) box 912. Extension of existing boxes needed to support the virtual object track is the same as the above description of the marker track 700.

The virtual object track 900 includes an object table (otbl) box 914 for expressing a virtual object used in each marker interval in addition to an existing box defined in the ISO media file described above. The otbl box 914 is a container box and is configured to contain an object table header (othd) box 914a, a mapping table (mtbl) 914b, and zero or more object description (odes) boxes 914c. The mtbl box 914b provides mapping information of the virtual object used in an individual mgrp box of a marker track, and the odes box 914c provides information for expressing the virtual object. The odes box 914c serves as the container in order to support various augmenting technologies for expressing the virtual object.

In the ISO based media file, a plurality of virtual object tracks may exist, and an individual track may exist independently according to a type of provided information or per service provider.

Therefore, when providing the augmented reality, a service is provided by connecting only one virtual object track, and a virtual object which exists on multiple virtual object tracks may not be combined and used.

An example format of the virtual object table (otbl) box 914 is shown below.

```
aligned(8) class VirtualObjectTable extends Box('otbl') {
}
```

An example format of the object table header (othd) box 914a is shown below.

```
aligned(8) class ObjectTableHeader extends Box('othd') {
unsigned int (32) next_object_ID;
unsigned int (32) object_entry_count;
unsigned int (32) service_provider_ID;
string description;
}
```

Here, next_object_ID is a value of Object_ID subsequently used, of which an initial value is set as 1, and a type of the odes box 914c needs to be different in order to use the same Object_ID. Object_entry_count indicates a number of the odes boxes included in the current track, service_provider_ID indicates an ID of the service provider which provides the virtual object track, and description indicates additional description of the current track.

An example format of the mapping table (mtbl) box 914b is shown below.

```
aligned(8) class MappingTable extends Box('mtbl') {
unsigned int (32) mapping_entry_count;
for (i = 1; i < mapping_entry_count; ++i) {
unsigned int (32) marker_group_ID;
unsigned int (32) object_ID;
  }
}
```

Here, mapping_entry_count indicates a number of mapping bits of information, marker_group_ID indicates marker_group_ID defined in the mgrp box 718 of the marker track 700, and object_ID indicates an ID of the virtual object that needs to be used in the identified marker interval. Object_ID is defined in the odes box 914c.

An example format of the object description (odes) box 914c is shown below.

```
aligned(8) class ObjectDescription extends Box('odes') {
unsigned int (32) object_ID;
unsigned int (32) type;
string object_desc
template int(32)[9] transformation_matrix;
template int(32)[9] rotation_matrix;
template int(32)[9] scale_matrix;
}
```

Here, object_ID indicates an ID of a corresponding virtual object, and type indicates a technology (e.g., VRML (Virtual Reality Modeling Language), 3DXML (3D Extensible Markup Language), etc.) used for expressing the virtual object. A virtual object which is described in different types using the same object_ID may exist, and in this case the media file reproducing apparatus determines which virtual object expressed in a certain technology is to be used. Object_desc describes the virtual object expressed in a technology indicated by the type, transformation_matrix represents a conversion matrix used when calculating movement of the virtual object which is used when expressing the virtual object on the reference virtual marker, rotation_matrix represents a matrix which is used when rotating the virtual object used when expressing the virtual object on the reference virtual marker, and scale_matrix represents a matrix used when calculating an expansion/reduction of the virtual object used when expressing the virtual object on the reference virtual marker.

Here, information expressed by the odes box 914c is as below. When the reference virtual marker defined on the marker track 700 is recognized, it is determined how to display the virtual object relative to the reference virtual marker by using three matrix values (i.e., transformation_matrix, rotation_matrix, scale_matrix) which stores information of three dimensional movement and magnification, wherein the virtual object is defined on an object_desc of the odes box 914c.

Figure 10:
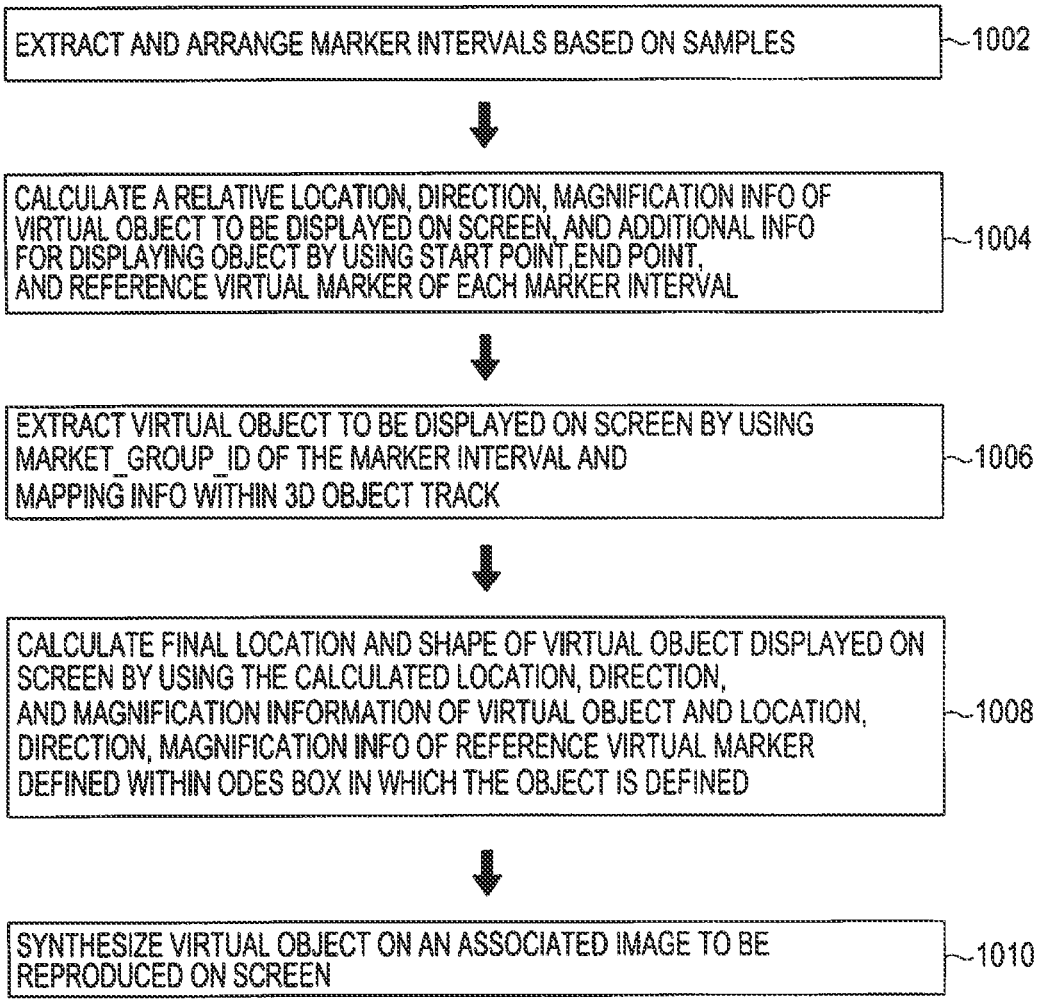
FIG. 10 is a schematic flowchart illustrating a process of synthesizing and reproducing a virtual object and an image in a marker interval according to an embodiment of the present invention.

FIG. 10 is a schematic flowchart illustrating a process of synthesizing and reproducing a virtual object and an image in a marker interval according to an embodiment of the present invention.

Referring to FIG. 10, the apparatus extracts and arranges at least one marker interval based on at least one sample in step 1002, calculates a relative location, direction, and magnification information of the virtual object to be displayed on the screen, and additional information for displaying a corresponding object by using the start point, the end point, and the reference virtual marker of each marker interval in step 1004, extracts the virtual object to be displayed on the screen by using the marker_group_ID of the marker interval and the mapping information within the virtual object track in step 1006, and calculates a final location and shape of the virtual object displayed on the screen by using the calculated location, direction, and magnification information of the virtual object and a location, direction, and magnification information of the reference virtual marker defined within the odes box 914c in which an object is defined in step 1008. In step 1010, the apparatus synthesizes the virtual object on an associated image to be reproduced on the screen.

Figure 11:
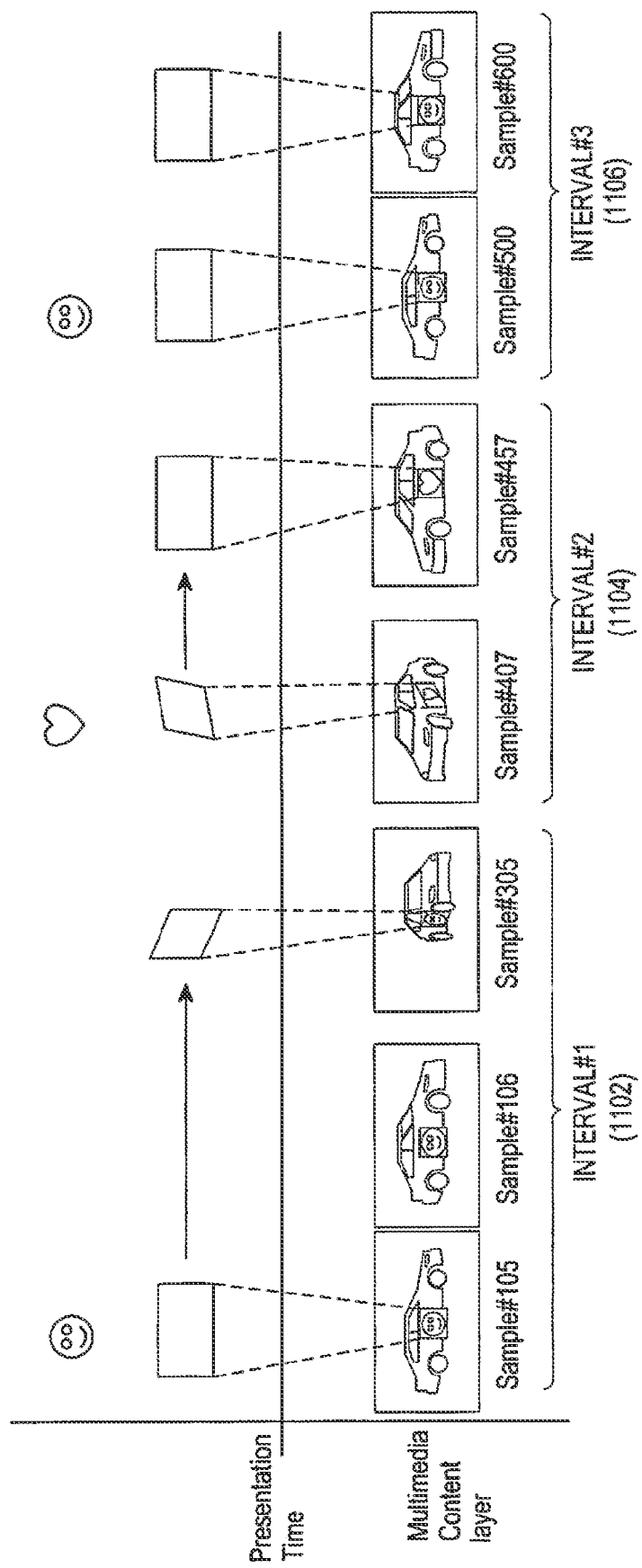
FIG. 11 is a schematic view illustrating an example of applying a marker track and a virtual object track according to an embodiment of the present invention.
Figure 12:
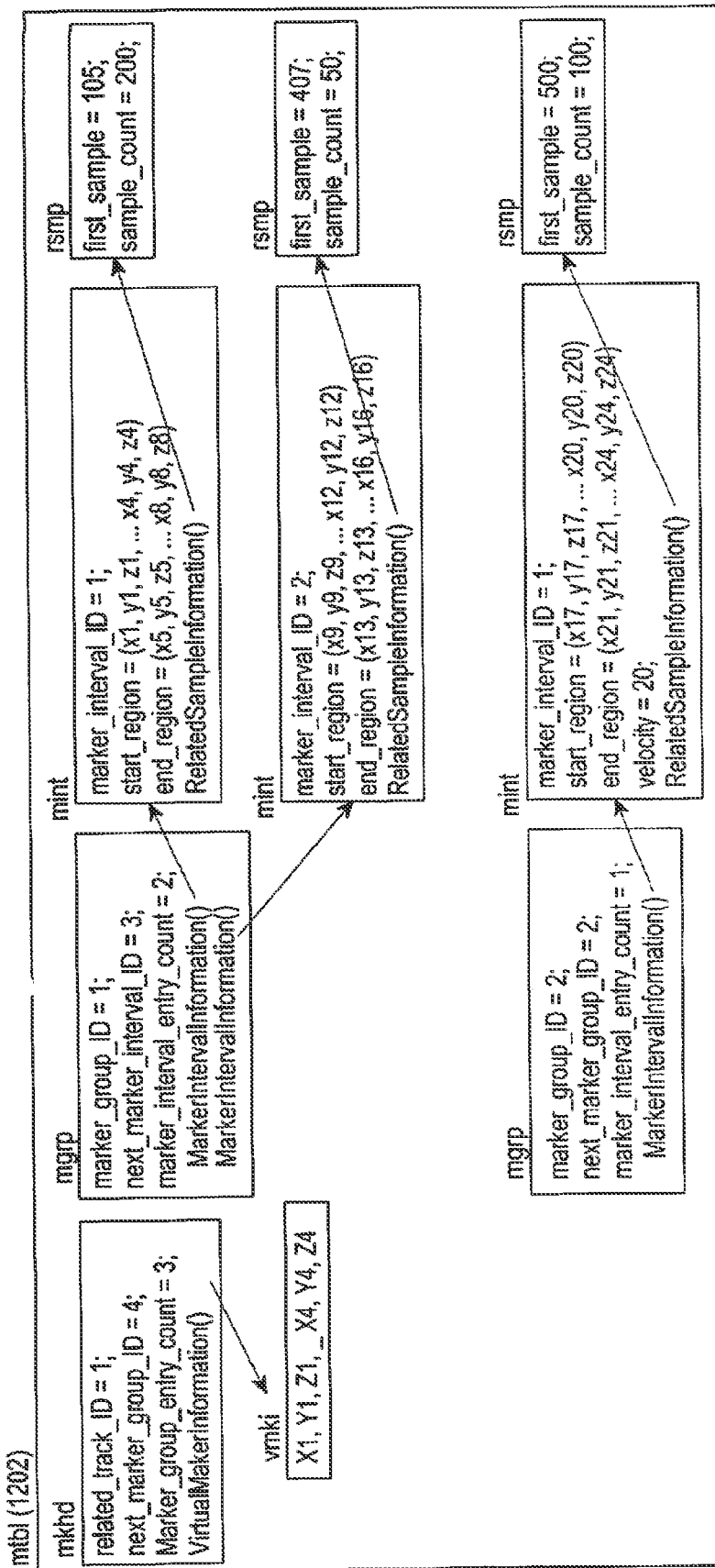

FIG. 11 is a schematic view illustrating an example of applying a marker track and a virtual object track according to an embodiment of the present invention; and FIGS. 12 and 13 illustrate contents of a main box of a marker track and a virtual object track according to an embodiment of the present invention.

Referring to FIG. 11, each marker interval 1102, 1104, 1106 is set based on movement of the virtual object on a straight line and a movement speed thereof. Particularly, a marker interval #1 1102 and a marker interval #3 1106 display the same virtual object (a smile icon in the example shown in FIG. 11) on the screen, and therefore, the two marker intervals 1102, 1106 belong to the same marker group.

The main boxes of the marker track and the virtual object track of FIG. 11, i.e., an mtbl 1202 and an otbl box 1302 have contents shown as FIGS. 12 and 13, respectively. Referring to FIG. 13, two odes boxes 1304a, 1304b of which object_ID is 1 exist, and each box 1304a, 1304b expresses the same virtual object using different technologies. In an embodiment of the present invention, the media file reproducing apparatus determines which virtual object expressed in a certain technology is to be used.

It should be noted that providing and processing the media file according to embodiments of the present invention may be implemented by hardware, software, or a combination of hardware and software. The media file and/or software, for example, regardless of whether a delete function or re-write function is provided, may be stored in a volatile or non-volatile storage device including a storage device such as a Read-Only Memory (ROM) or a memory such as a Random Access Memory (RAM), a memory chip, a device, or an integrated circuit, or a storage medium which enables an optical or magnetic recording as well as being readable by a machine (e.g., a computer) such as a compact disk (CD), a digital versatile disk (DVD), a magnetic disk, or a magnetic tape.

Also, providing and processing of the media file may be implemented by a computer or a portable apparatus including a controller and a memory, and the memory may be an example of a machine readable storage medium suitable for storing a program or programs including instructions that implement embodiments of the present invention.

Therefore, the present invention includes a machine-readable storage medium which stores a program or programs including codes for implementing a method described by the appended claims. Also, such a program may be electrically transmitted through any medium similar to a communication signal which is propagated by wire or wirelessly, and the present invention includes equivalents thereof.

Also, a media file reproducing apparatus of the present invention may receive and store the media file and/or the program from a media file providing apparatus which is connected via a wire or wirelessly thereto. The program providing apparatus may include at least one of a memory for storing the media file according to the present invention; a memory (storage unit) for storing a program including instructions for performing a preset media file processing by the media file reproducing apparatus and information needed for processing the media file; a communication unit for performing a wire or wireless communication with the media file reproducing apparatus; and a controller for transmitting a corresponding program to the communication unit in response to a request from the media file reproducing apparatus, or automatically.

According to embodiments of the present invention, the virtual object used in the augmented reality and information about an area on an image in which a corresponding virtual object is displayed are stored in advance within the media file, thereby effectively providing various augmented reality services. Also, a receiving apparatus may overcome limitations regarding physical resources such as a battery and a computation capacity required to obtain, in real time, information, which is needed for providing the augmented reality service, and various types of media files that already exist may be recycled for the augmented reality service.

By utilizing embodiments of the present invention, a logo of a company related to an image being reproduced may be provided to the user to further maximize an advertisement effect. For example, a logo of a company which manufactures an accessory worn by a leading actor may be displayed when a drama is reproduced and a logo of a company of a fully built vehicle may be displayed in a case of a car racing relay broadcast.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method of processing a media file for an augmented reality service, comprising:
    analyzing at least one media file including a marker track and a virtual object track to be used for providing the augmented reality service;
    generating image data needed for reproducing an image by extracting the image data from -the media file;
    generating virtual object data for displaying a virtual object by extracting virtual object information included in the media file; and
    synthesizing the image data and the virtual object data based on the marker track and the virtual object track to structure a final image and reproducing the final image on a screen,
    wherein the marker track comprises a related track identifier (ID) indicating a video track to be synthesized with the virtual object and a next marker group identifier indicating a marker group to be used subsequently.

2. The method of claim 1, wherein the marker track comprises a marker table (mtbl) which stores a relative coordinate of an area in which the virtual object is displayed on the screen and additional information needed to express the virtual object, and
    wherein the mtbl box defines a plurality of marker intervals on a time axis which is classified according to a characteristic which varies as the virtual object moves.

3. The method of claim 2, wherein the mtbl box comprises at least one marker header (mkhd) box which includes a virtual marker information (vmki) box indicating a reference virtual marker to be compared with a virtual marker used in each marker interval, and at least one marker group (mgrp) box which stores information of marker intervals included in the same marker group among the plurality of marker intervals.

4. The method of claim 3, wherein the mgrp box comprises at least one marker interval information (mint) box representing each marker interval, and
    wherein each mint box comprises a related sample information (rsmp) box which stores sample information used in a corresponding marker interval.

5. The method of claim 3, wherein the plurality of marker intervals are grouped into a plurality of marker groups including at least one marker interval which uses the same virtual object.

6. The method of claim 3, wherein the marker header box comprises:
    a marker group entry count indicating a number of the mgrp box included in a current track.

7. The method of claim 2, wherein the marker track further comprises a Handler Reference (hdlr) box which stores a type of a current track, and
    wherein the hdlr box is set to a value indicating one of a location track or the virtual object track.

8. The method of claim 1, wherein the virtual object track comprises an object table (otbl) box for storing information about a virtual object to be displayed on the screen and for expressing a virtual object used in each of a plurality of marker intervals on a time axis which is classified based on a characteristic varying according to movement of the virtual object.

9. The method of claim 8, wherein the otbl box comprises an object table header (othd) box, at least one mapping table (mtbl) box which provides mapping information of a virtual object used in marker intervals included in the same group among the plurality of marker intervals and at least one object description (odes) box which expresses a type of an augmented reality technology for expressing the virtual object.

10. The method of claim 9, wherein the othd box comprises at least one of:
    a subsequent object identifier (ID) representing a virtual object to be used subsequently;
    an object entry count representing a number of odes boxes included in the virtual object track;
    a service provider identifier representing a service provider which provides the virtual object track; and
    additional description of the virtual object track.

11. The method of claim 9, wherein the mtbl box comprises a mapping entry count representing the number of bits of mapping information and at least one of the bits of mapping information, and
    wherein each of the bits of mapping information comprises a marker group identifier defined by the marker track and an object identifier which indicates a virtual object to be used in a marker interval identified as the marker group identifier.

12. The method of claim 9, wherein each of the odes boxes comprises at least one of:
    an object identifier indicating a corresponding virtual object;
    a type indicating an augmented reality technology for expressing the virtual object;
    description of the virtual object expressed by the augmented reality technology indicated by the type;
    a conversion matrix used when calculating movement of the virtual object in order to express the virtual object on a reference virtual marker; and
    a scale matrix used when calculating an expansion or reduction of the virtual object in order to express the virtual object on the reference virtual marker.

13. The method of claim 9, wherein the plurality of marker intervals are grouped into a plurality of marker groups including at least one marker interval which each uses the same virtual object.

14. An apparatus for processing a media file for an augmented reality service, comprising:
a processor adapted to:
analyze at least one media file including a marker track and a virtual object track to be used for providing the augmented reality service,
generate image data needed for reproducing an image by extracting the image data included in the media file,
generate virtual object data for displaying a virtual object by extracting virtual object information included in the media file, and
synthesize the image data and the virtual object data based on the marker track and the virtual object track to structure a final image; and
a display adapted to display the final image on a screen,
wherein the marker track comprises a related track identifier (ID) indicating a video track to be synthesized with the virtual object and a next marker group identifier indicating a marker group to be used subsequently.

15. The apparatus of claim 14, wherein the marker track comprises a marker table (mtbl) which stores a relative coordinate of an area in which the virtual object is displayed on the screen and additional information needed to express the virtual object, and
wherein the mtbl box defines a plurality of marker intervals on a time axis which are classified according to a characteristic which varies as the virtual object moves.

16. The apparatus of claim 15, wherein the mtbl box comprises at least one marker header (mkhd) box which includes a virtual marker information (vmki) box indicating a reference virtual marker to be compared with a virtual marker used in each marker interval, and at least one marker group (mgrp) box which stores information of marker intervals included in the same marker group among the plurality of marker intervals.

17. The apparatus of claim 16, wherein the mgrp box comprises at least one marker interval information (mint) box representing each marker interval, and
wherein each mint box comprises a related sample information (rsmp) box which stores sample information used in a corresponding marker interval.

18. The apparatus of claim 16, wherein the plurality of marker intervals are grouped into a plurality of marker groups including at least one marker interval which uses the same virtual object.

19. The apparatus of claim 16, wherein the marker header box comprises:
a marker group entry count indicating a number of mgrp boxes included in a current track.

20. The apparatus of claim 15, wherein the marker track further comprises a Handler Reference (hdlr) box which stores a type of a current track, and
wherein the hdlr box is set to a value indicating one of a location track or the virtual object track.

21. The apparatus of claim 14, wherein the virtual object track comprises an object table (otbl) box for storing information about a virtual object to be displayed on the screen and for expressing a virtual object used in each of a plurality of marker intervals on a time axis which is classified based on a characteristic varying according to movement of the virtual object.

22. The apparatus of claim 21, wherein the otbl box comprises an object table header (othd) box, at least one mapping table (mtbl) box which provides mapping information of a virtual object used in marker intervals included in the same group among the plurality of marker intervals and at least one object description (odes) box which expresses a type of an augmented reality technology for expressing the virtual object.

23. The apparatus of claim 22, wherein the othd box comprises at least one of:
a subsequent object identifier (ID) representing a virtual object to be used subsequently;
an object entry count representing a number of the odes boxes included in the virtual object track;
a service provider identifier representing a service provider which provides the virtual object track; and
additional description of the virtual object track.

24. The apparatus of claim 22, wherein the mtbl box comprises a mapping entry count representing the number of bits of mapping information and at least one of the bits of mapping information, and
wherein each of the bits of mapping information comprises a marker group identifier defined by the marker track and an object identifier which indicates a virtual object to be used in a marker interval identified as the marker group identifier.

25. The apparatus of claim 22, wherein the odes box comprises at least one of:
an object identifier indicating a corresponding virtual object;
a type indicating an augmented reality technology for expressing the virtual object;
description of the virtual object expressed by the augmented reality technology indicated by the type;
a conversion matrix used when calculating movement of the virtual object in order to express the virtual object on a reference virtual marker; and
a scale matrix used when calculating an expansion or reduction of the virtual object in order to express the virtual object on the reference virtual marker.

26. The apparatus of claim 22, wherein the plurality of marker intervals are grouped into a plurality of marker groups including at least one marker interval which each uses the same virtual object.

* * * * *